A. C. TUNISON.
PIPE MAKING MACHINE.
APPLICATION FILED JULY 7, 1913.

1,137,680.

Patented Apr. 27, 1915.
9 SHEETS—SHEET 1.

Witnesses
Edwin J. Beller
[signature]

Inventor
A. C. Tunison
by Wilkinson, Giusta & MacKaye
Attorneys

A. C. TUNISON.
PIPE MAKING MACHINE.
APPLICATION FILED JULY 7, 1913.

1,137,680.

Patented Apr. 27, 1915.
9 SHEETS—SHEET 5.

Fig. 5.

A. C. TUNISON.
PIPE MAKING MACHINE.
APPLICATION FILED JULY 7, 1913.

1,137,680.

Patented Apr. 27, 1915.
9 SHEETS—SHEET 6.

WITNESSES:
Edwin J Beller.
R. J. Mawhinney

INVENTOR
A. C. Tunison.
by Wilkinson, Ginola & MacKaye.
ATTORNEYS

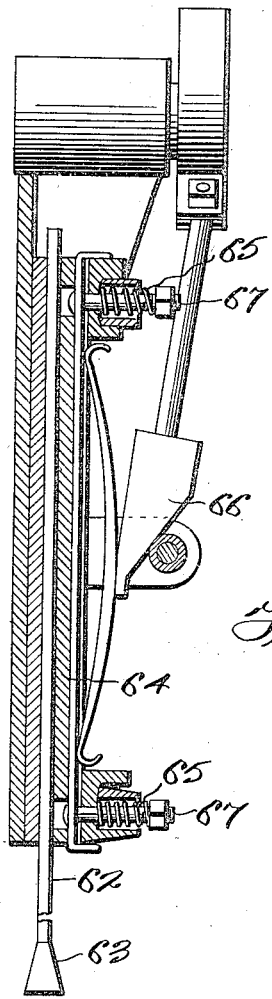
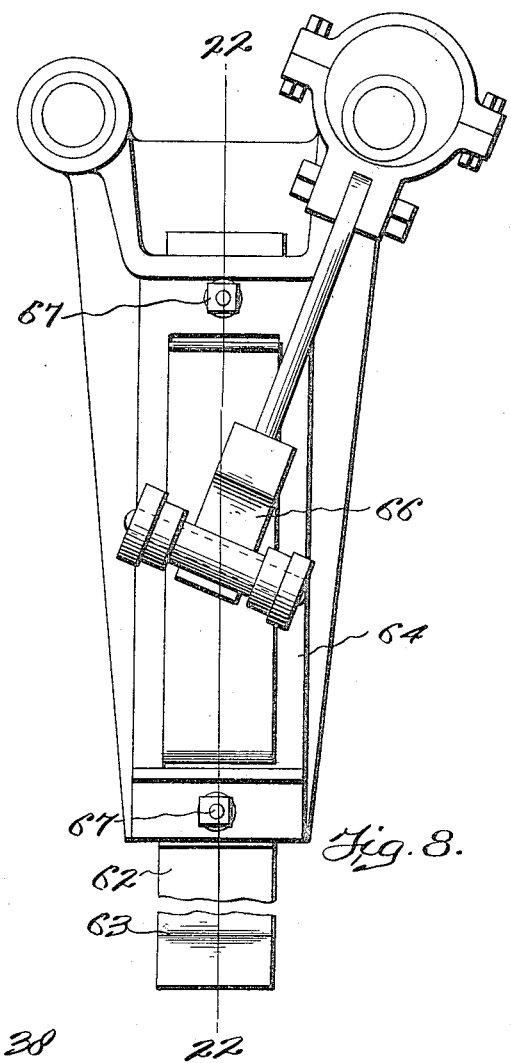
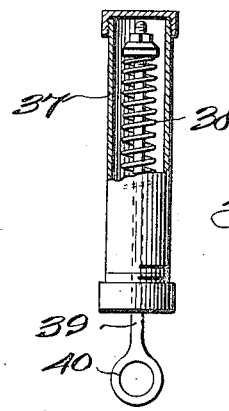

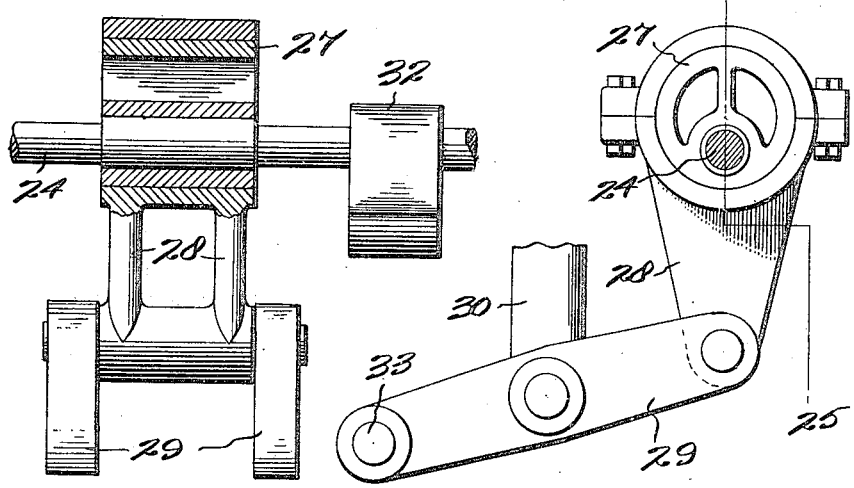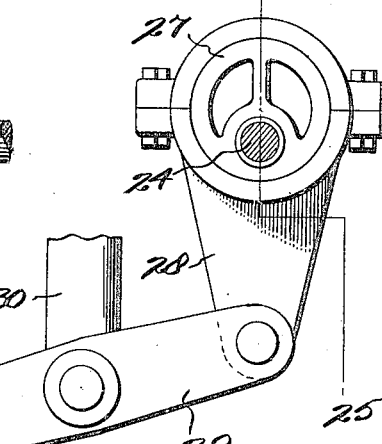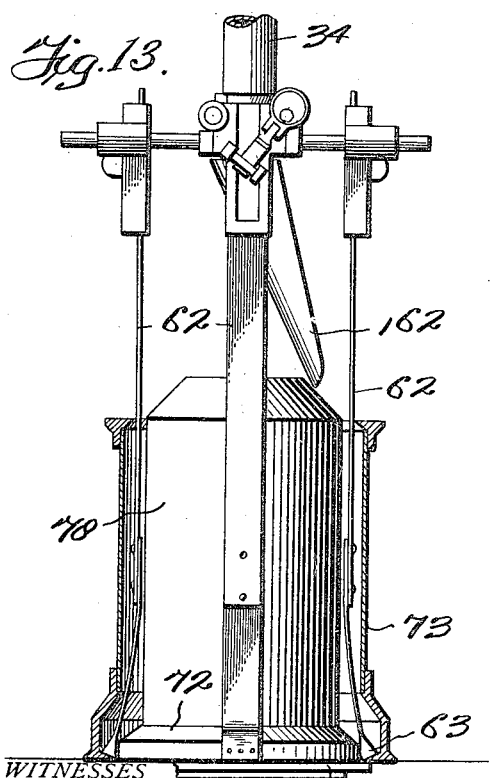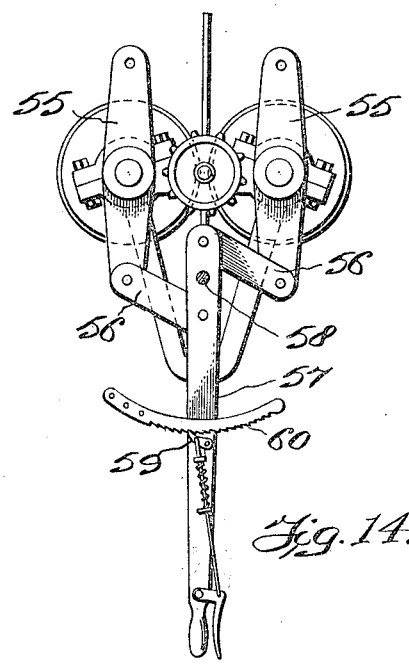

A. C. TUNISON.
PIPE MAKING MACHINE.
APPLICATION FILED JULY 7, 1913.
1,137,680.
Patented Apr. 27, 1915.
9 SHEETS—SHEET 9.
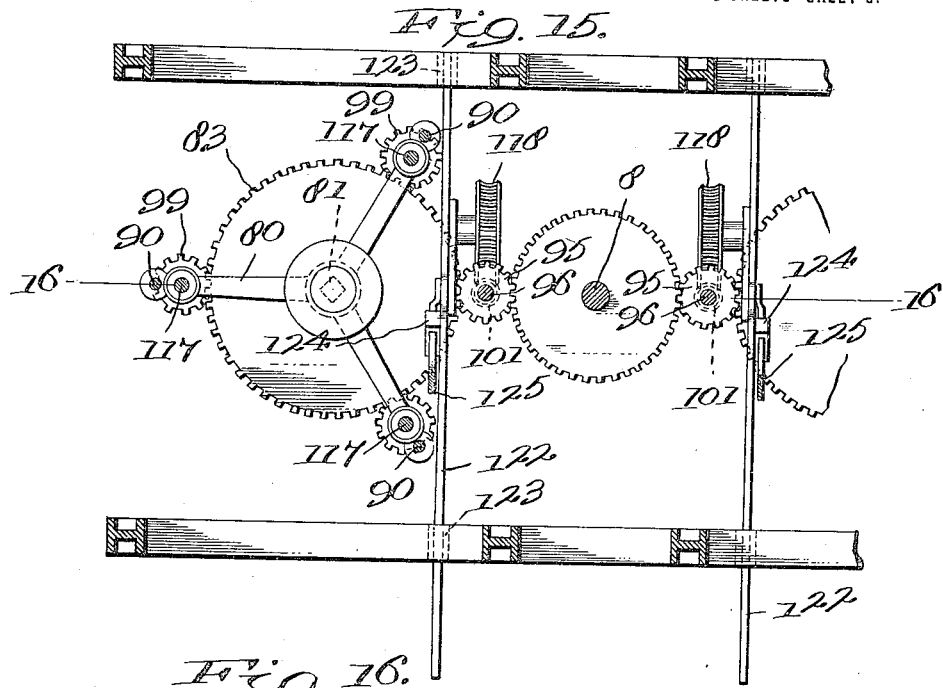
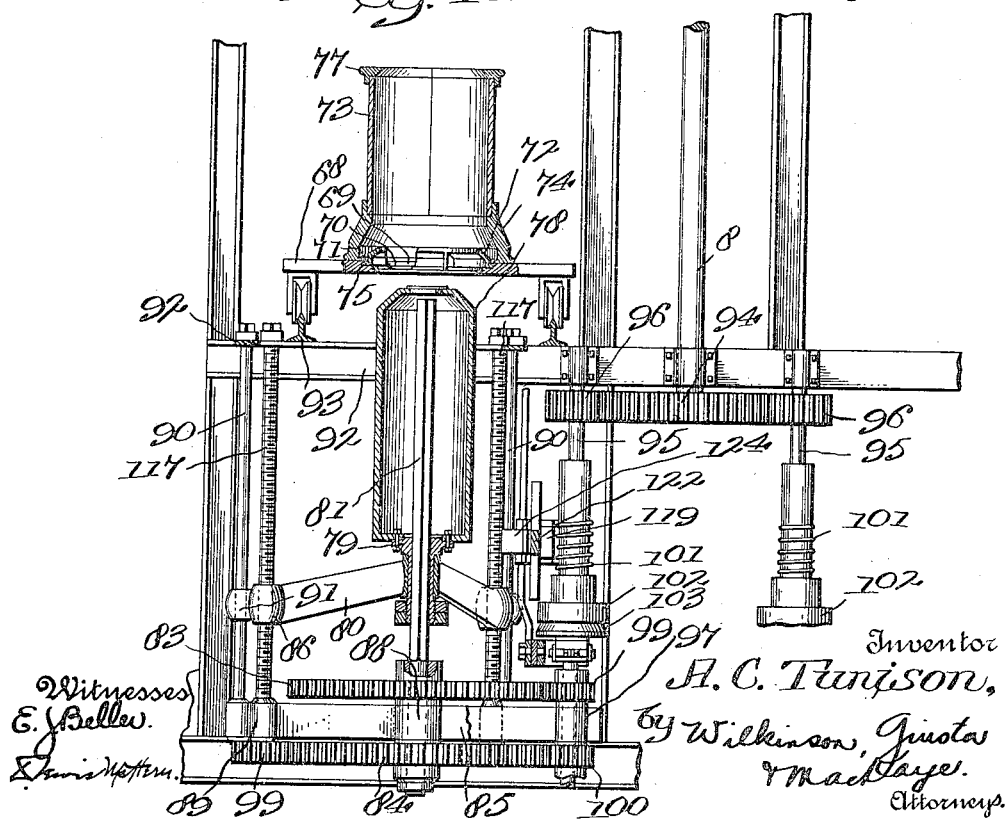

UNITED STATES PATENT OFFICE.

ARTHUR C. TUNISON, OF SALT LAKE CITY, UTAH, ASSIGNOR TO ATLAS CONCRETE PIPE MACHINERY COMPANY, OF SALT LAKE CITY, UTAH, A CORPORATION OF UTAH.

PIPE-MAKING MACHINE.

1,137,680. Specification of Letters Patent. Patented Apr. 27, 1915.

Application filed July 7, 1913. Serial No. 777,796.

*To all whom it may concern:*

Be it known that I, ARTHUR C. TUNISON, a citizen of the United States, residing at Salt Lake City, in the county of Salt Lake and State of Utah, have invented certain new and useful Improvements in Pipe-Making Machines; and I do hereby declare the following to be a full, clear, and exact description of the invention, such as will enable others skilled in the art to which it appertains to make and use the same.

My invention relates to improvements in pipe molding machines, and it consists in the constructions, combinations and arrangements herein described and claimed.

An object of my invention is to provide an improved machine for forming pipes of concrete or other plastic material, which will operate automatically to insure a uniform strength and density of the material throughout the pipe length.

A further object of my invention is to provide an improved machine for forming concrete or other plastic pipes having bell ends, in which the material will be evenly tamped in the flaring mold ends and the pipe formed with a smooth interior surface free from all smears and roughness.

Figure 1:
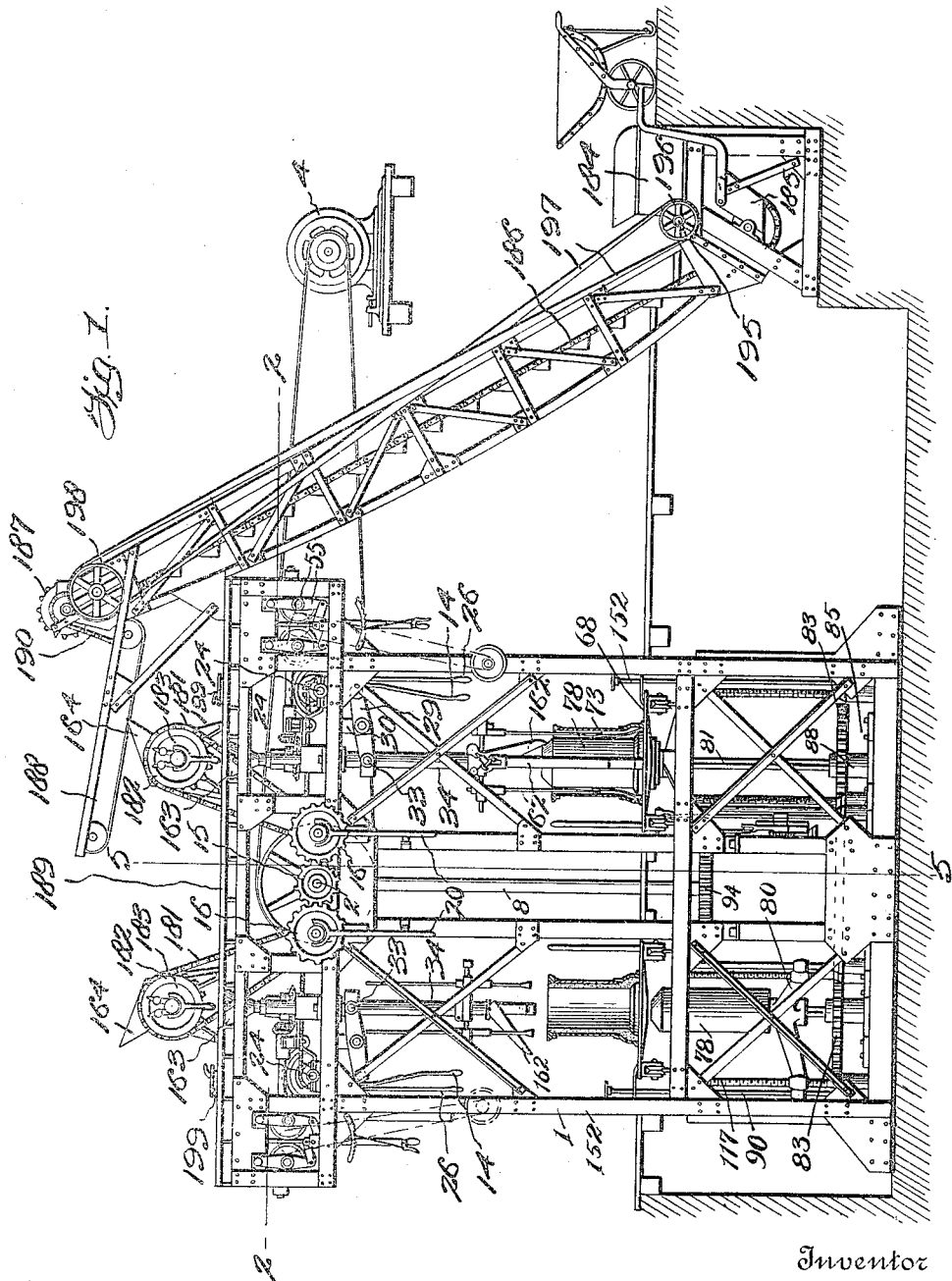
Figure 2:
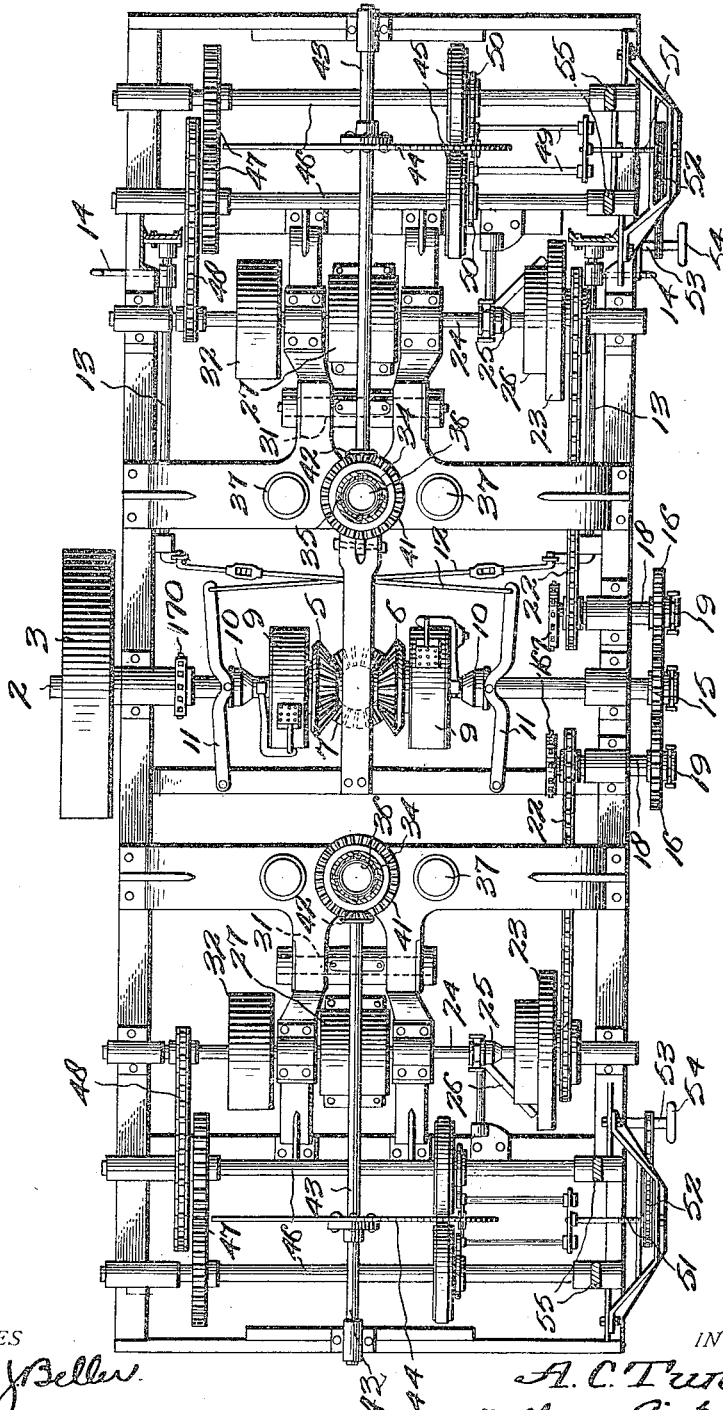
Figure 3:
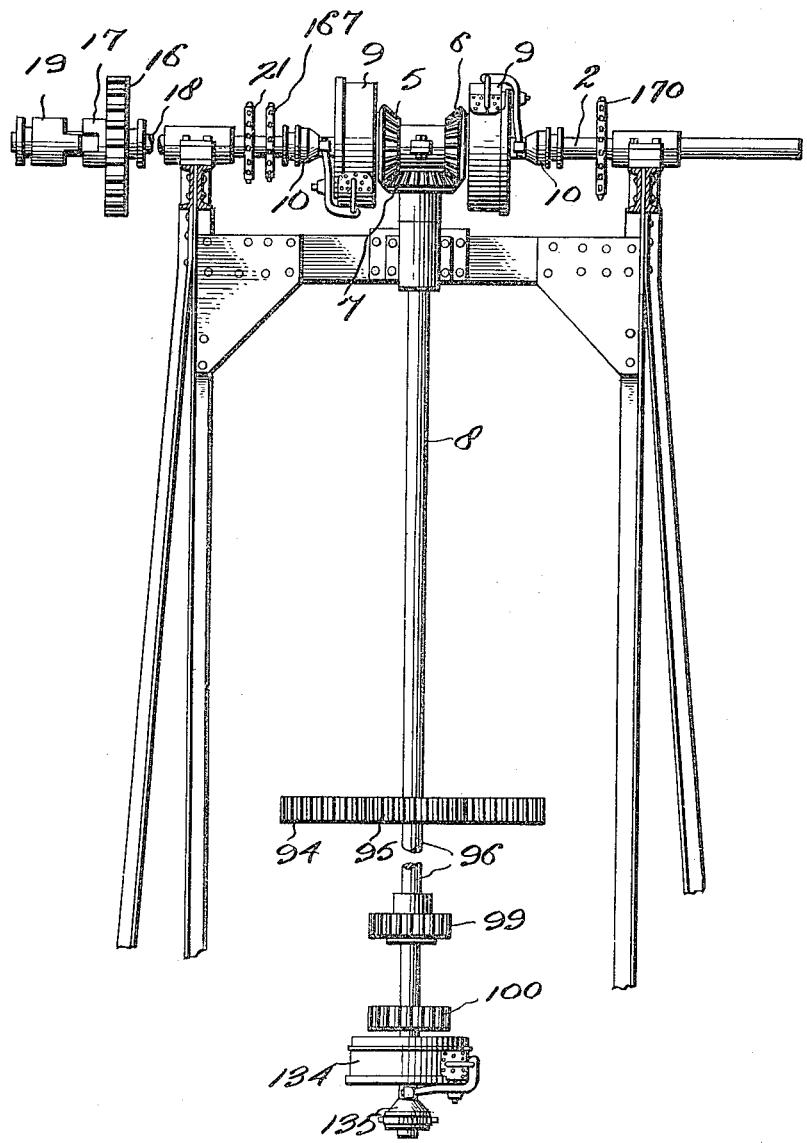
Figure 4:
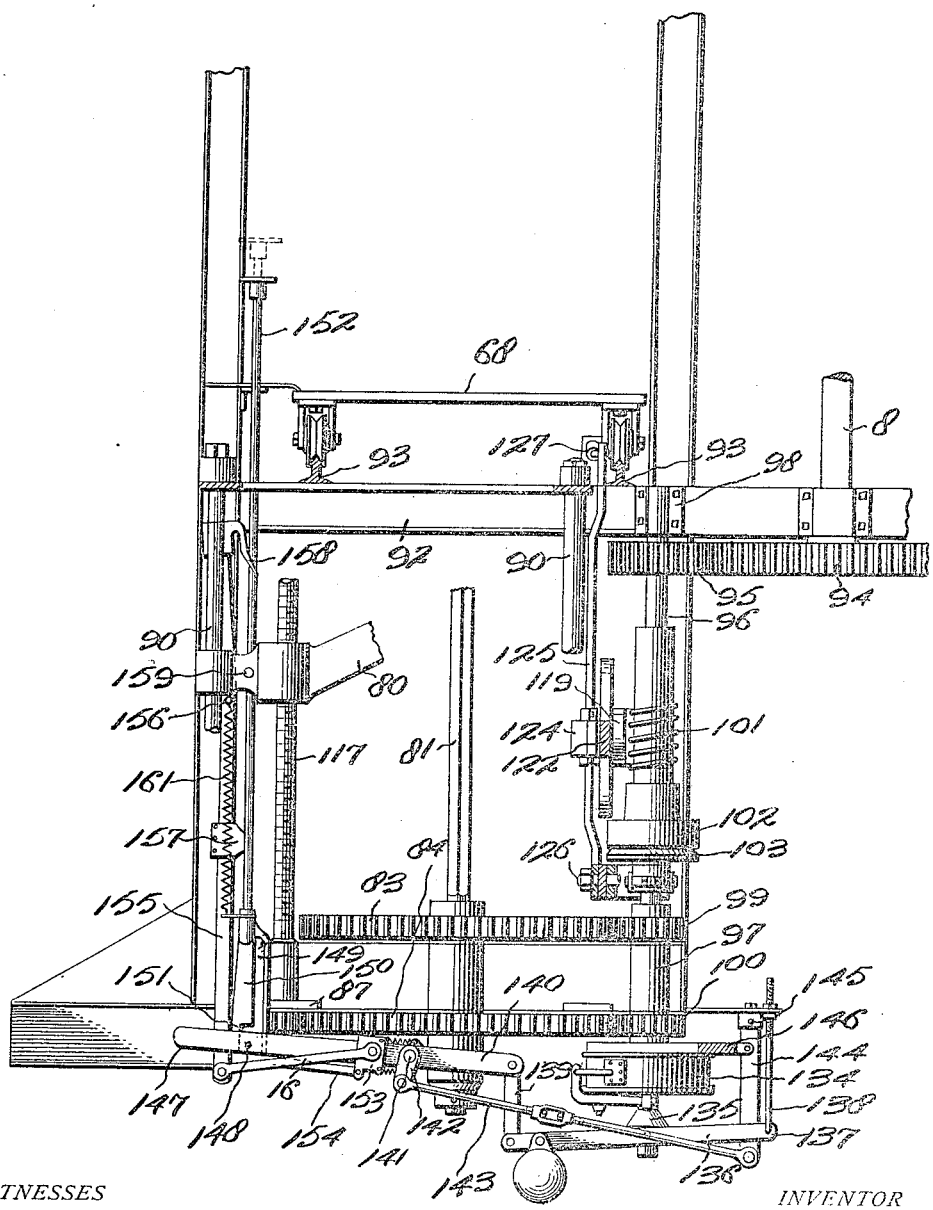
Figure 6:
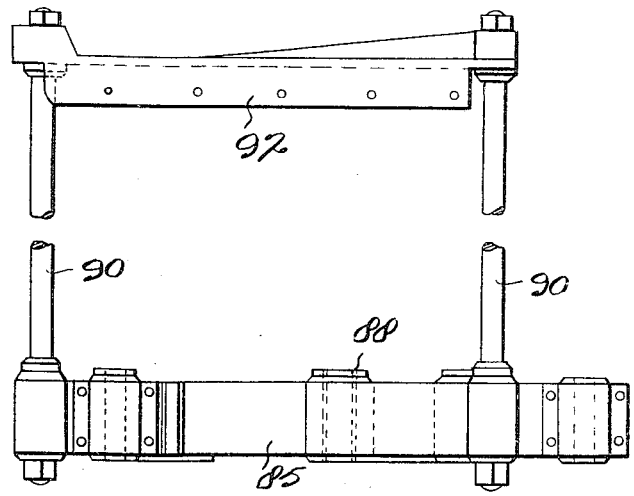
Figure 7:
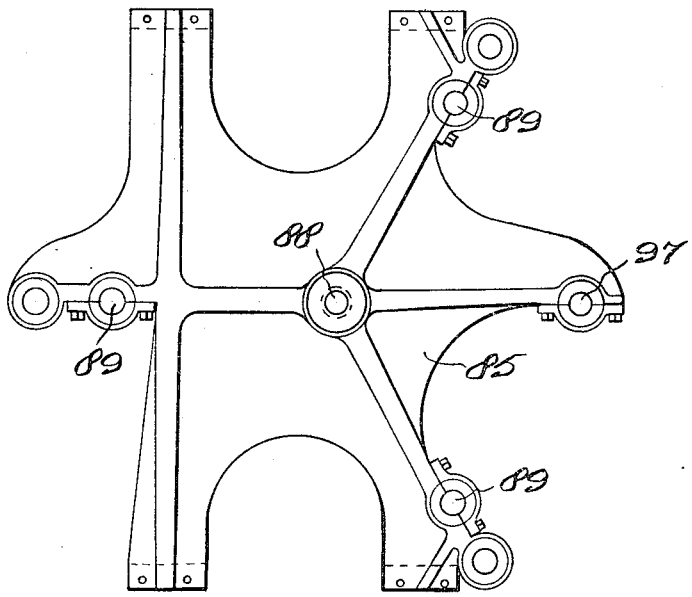

In the accompanying drawings, forming a part of this application and in which similar reference symbols indicate corresponding parts in the several views: Figure 1 is a side elevation illustrating one embodiment of my invention; Fig. 2 is a section on the line 2—2 of Fig. 1; Fig. 3 is a detail vertical section on the line 5—5 of Fig. 1, showing the central vertical shaft and its connections to the main drive shaft; Fig. 4 is an enlarged front elevation of the mechanism shown at the lower left-hand portion of Fig. 1, parts being omitted for clearness; Fig. 5 is an elevation at the right of Fig. 4; Fig. 6 is a front elevation of the upper and lower frames carried by the guide rods in Figs. 4 and 5; Fig. 7 is a plan of the lower frame shown in Fig. 6; Fig. 8 is an enlarged front view of one of the tampers and its supporting head shown in Fig. 1; Fig. 9 is a section on the line 22—22 of Fig. 8; Fig. 10 is an enlarged detail view of one of the supporting springs for the rocking arm shown in Figs. 1 and 2; Fig. 11 is an enlarged front view of the rocking arm and its actuating eccentric; Fig. 12 is a section on the line 25—25 of Fig. 24; Fig. 13 is an axial section of a pipe mold, showing the core and tappets in position therein; Fig. 14 is an enlarged front view of the means shown in Figs. 1 and 2 for clamping the friction drive wheels in engagement; Fig. 15 is a horizontal section through the lower part of Fig. 1 just above the spider 80, shown to the left of that figure; Fig. 16 is a section taken on the line 16—16 of Fig. 15.

In the drawings, I have shown my invention embodied in a double machine comprising duplicate mechanisms mounted on a pair of similar trussed frames 1, which are rigidly connected together at the opposite sides of a horizontal main drive shaft 2; said shaft being provided with a drive pulley 3 belted to any suitable source of power, such as a motor 4. A pair of bevel gears 5 and 6 are loosely mounted on said drive shaft 2 in mesh with the opposite sides of a bevel gear 7 secured on the upper end of a central vertical shaft 8. Friction clutches 9 are shown on the drive shaft 2 for locking the respective loose gears 5 and 6 thereto; the shiftable locking cones 10 of said clutches being pivoted to levers 11 connected by adjustable links 12 to crank rods 13, which latter are provided with manually-operated handles 14 for throwing said clutches 9 into and out of engagement.

A spur gear 15 is secured on the drive shaft 2 in mesh with a pair of similar gears 16 provided with extended notched hubs 17 loosely mounted on stud shafts 18; sliding clutches 19 being splined on the shafts 18 and provided with manually-operated handles 20 for locking the gears 16 on said shafts. The stud shafts 18 carry sprocket wheels 21 connected by sprocket chains 22 to sprocket wheels secured on the loose members of friction clutches 23 mounted on horizontal shafts 24 at the respective sides of the main drive shaft 2; the shiftable locking cones 25 of said clutches 23 being provided with manually-operated handles 26 for throwing said clutches into and out of engagement. Each shaft 24 carries an eccentric 27 having its radius rod 28 connected to a pair of spaced rocking arms 29 pivoted to a link 30, which latter is supported by a shaft 31 journaled on the frame; said eccentric shafts 24 being provided with counter-weights 32 for balancing the parts supported by the free ends of said rocking arms 29, Each pair of rocking arms 29 is provided with gimbals 33 engaging an annular circumferential groove in a tubular plunger 34, which latter is reciprocatingly mounted by splines 35 on a rotatable feed tube 36; cylindrical casings 37 being supported on the frame for inclosing counterbalancing springs 38 supporting rods 39, which are provided at their lower ends with eyes 40 for connection to said reciprocating plungers 34.

Each feed pipe 36 is rotatably supported at its upper end on the frame and provided with a bevel gear 41 in mesh with a similar gear 42 on a spindle 43, which latter carries a friction disk 44 adapted to be driven by a pair of friction wheels 45 splined on counter-shafts 46; said counter-shafts 46 carrying inter-meshing spur gears 47, and being driven from the adjacent eccentric shaft 24 by a sprocket chain 48 engaging sprocket wheels on said shaft 24 and one of said shafts 46.

A yoke 49 carries straps 50 rotatably mounted in annular circumferential grooves in the hubs of the splined friction wheels 45, for shifting said wheels radially across the friction disk 44 to drive the latter at different speeds for varying the rotative speed of the feed tube 36 and reciprocating plunger 34. The stem 51 of each guide yoke 49 is threaded through the hub of a sprocket wheel, which latter is connected by a sprocket chain 52 to a sprocket wheel on a stub shaft 53 provided with a hand wheel 54; thereby providing convenient means for accurately shifting said friction wheels 45 on the friction disk 44.

The ends of each pair of counter-shafts 46 adjacent to the friction wheels 45 are journaled in levers 55 pivotally supported at their upper ends on the frame and having their free ends connected by links 56 to a hand lever 57, which latter is pivoted at 58 on the frame and provided with a spring latch 59 engaging a notched quadrant 60 for locking said lever in its several positions; thereby providing means for accurately adjusting the contact pressure of said friction wheels 45 on the friction disk 44.

A series of clamping devices 61 similar to those shown in my prior Patent #1,025,035, of April 30, 1912, are mounted on the lower end of each reciprocating plunger 34 for frictionally clamping a series of spring plates 62 provided with tamping heads 63 on their lower ends; the movable members 64 of said clamping devices being connected to rods 67 engaged by springs 65 for positively shifting said movable members to open position for disengaging the spring tamper blades 62 upon release of the wedge 66. The tamper blades 62 are advantageously formed of wide thin plates of tempered steel, such as employed in the manufacture of saws.

The platen of a car 68 is provided with a circular aperture 69 having a rabbeted edge 70 for closely fitting the peripheral flanges 71 of any of a series of bell rings 72 of different sizes adapted to be interchangeably secured on said platen. A series of interchangeable pipe molds 73 are provided with flaring lower bell ends 74 adapted to seat on said platen and formed with annular inner-base flanges 75 for closely fitting the peripheries of the corresponding bell rings; said molds being preferably provided with radial base projections 76 adapted to engage said platen for preventing rocking of the mold thereon. The top of the mold 73 is provided with a beveled ring 77 forming an inclined spigot end on the pipe. The inclined faces on the spigot and bell ends of two interengaged pipes coöperate to provide an outwardly converging wedge-shaped annular pocket for receiving a packing of wet mortar; whereby said packing will be tightly wedged into the outer narrow portion of said annular recess by the internal pressure in the pipe. A pipe core 78 is adapted to be inserted through said apertured platen and the bell ring 72 secured on the latter, when said platen is in position for supporting the mold in operative position below the tampers 63; a series of cores being provided for closely fitting through the different bell rings. The core 78 is adapted to be bolted to a head 79 swiveled on a spider 80 and provided with a square bore for slidingly receiving a vertical square shaft 81; the lower end of said shaft 81 being journaled at 88 in a lower frame 85 and provided with fast and loose gears 83 and 84. A series of screw shafts 117 are threaded at 86 through the spider 80, with their lower ends journaled at 89 in said frame 85; said shafts 117 being provided with pinions 87 in mesh with said loose gear 84. A series of guide rods 90 extend slidably through openings 91 in the spider 80 and are rigidly secured to said lower frame 85 and to an upper frame 92 on which are supported the tracks 93 for the pipe car 68.

The lower end of the central vertical shaft 8 carries a gear 94 in mesh with gears 95 on lateral shafts 96 journaled in each pair of upper and lower frames 85 and 92 at 97 and 98 respectively. Fast and loose pinions 99 and 100 are mounted on each lateral shaft 96 in mesh with the gears 83 and 84 of the adjacent shaft 81, and a worm 101 is secured on the loose member 102 of a friction clutch mounted on each shaft 96; the shiftable member 103 of said clutch being splined on the shaft 96 and actuatingly connected to a bent lever 104. The lever 104 is pivoted to the machine frame at 105 and carries a brake 106 adapted to engage the loose clutch member 102 in the disengaged position of said lever; the upper end of said lever 104 carrying a pin 107 adapted to ride freely in a slot 108 formed in a head 109 and to engage in a short recess 110 extending from the upper wall of said slot. The head 109 is swingingly supported by an adjustable rod 111 pivoted at 112 to a crank 113 secured on a rock shaft 114; a counter-balanced lever 115 being secured on said shaft 114 and connected to a foot pedal 116. In this construction, the weight of the counter-balanced lever 115 normally maintains the foot pedal elevated and the head 109 swung into its extreme left hand position with the recess 110 engaging the pin 107 of the bent lever 104; said lever 104 being thus swung into its normally disengaging position.

When it is desired to engage the clutch members 102 and 103, the pedal 116 is depressed by the operator to draw the head 109 to the right; whereupon the recess 110 of said head will engage the pin 107 of the bent lever 104 and swing said lever to its engaging position. The head 109 thus constitutes a normally-engaged swinging latch. The worm 101 meshes with a worm wheel 118 journaled on the machine frame and provided with a crank 119 having a crank pin 120 slidably engaging a slot 121 in a bar 122 reciprocatingly mounted in guides 123 on the frame. A hollow head 124 is pivoted on the bar 122 and slidably engages a lever 125, which latter is pivoted on the machine frame at 126 and carries a link 127 at its upper end; said link 127 being provided with a hook or otherwise adapted to detachably engage the pipe car 68 for shifting the latter from beneath the tampers 63 when a pipe has been completed. The reciprocating bar 122 carries a pair of cams 128 and 129 adapted to alternately engage the head 130 of a lever 131 at the respective ends of the travel of said reciprocating bar. The lever 131 is pivoted on the machine frame at 132 and carries a spring-pressed trigger 133, which is adapted to engage and lift the swinging head 109 when said lever 131 is elevated by the cams 128 and 129; thereby releasing the pin 107 of the bent lever 104 from the recess 110 in said swinging head 109 and thus freeing said bent lever so that the shiftable clutch member 103 can drop by its own weight into disengaged position. This provides an improved means for automatically controlling the operation of the car shifting mechanism to positively limit the movement of the car and to return said mechanism to operative position for shifting a succeeding car.

Each loose pinion 100 is carried by the loose member 134 of a friction clutch on the corresponding lateral shaft 96; the shiftable locking cone 135 of said clutch being splined on said shaft and swiveled to a weighted lever 136 fulcrumed at 137 on an adjustable rod 138. The free end of said lever 136 is connected by a link 139 to a crank 140 secured to a shaft 141 on the frame. A crank 142 on said shaft 141 is connected by an adjustable rod 143 to a lever 144 pivoted on the frame at 145; said lever 144 carrying a brake block 146 for the loose clutch member 134. An arm 147 is secured on the shaft 141 and provided with a pin 148 adapted to travel freely in a slot 149 in a head 150 and to engage a short recess 151 extending from said slot; the head 150 being carried at the lower end of a foot pedal 152. A hollow head 153 is slidably mounted on the arm 147 and carries a trigger 154 adapted to engage the head 150 for forcing the latter to the left; the spring of the long foot pedal 152 permitting sufficient movement of said head to shift the recess 151 from engagement with the pin 148 of the arm 147. A lever 155 is pivoted on the frame at 156 and provided with a pair of cams 157 and 158 adapted to be engaged alternately by a trip bar 159 on the spider 80 at the respective ends of the travel of said spider; the lower end of said lever 155 being connected by the link 160 to the hollow head 153.

In the above described construction, the weighted lever 136 acts to maintain the clutch cone 135 depressed in disengaged position, and to elevate the arm 147 with its pin 148 engaged in the recess 151 of the head 150 in the normally raised position of said head. When it is desired to throw in the clutch 134 and 135 the head 150 is depressed by the foot pedal 152, whereupon the recess 151 of said head engages and carries down the pin 148 of the arm 147; thereby turning the shaft 145 and swinging the lever 136 upwardly to shift the clutch cone 135 into engaged position. In this shifted position of the parts, the pinion 100 will drive the gear 84, which latter meshes with the pinions 87 on the screws 117 for rotating said screws to elevate or depress the spider 80 and the pipe core carried thereby. The direction of movement of said spider is controlled by locking either the forward-drive gear 5 or the reverse drive gear 6 to the main drive shaft 2 for rotating the vertical center shaft 8 in either a forward or reverse direction.

When the spider 80 approaches either limit of its movement, the trip rod 159 thereon will engage the upper cam 158 or lower cam 157 and swing the lower end of the lever 155 outwardly; thereby pulling the link 160 and trigger head 153 to the left until the trigger 154 engages the head 150 and shifts the latter sufficiently to disengage the short recess 151 thereof from the pin 148. In this released position of the pin 148, the weighted lever 136 will shift the clutch cone 135 to its normally disengaged position and swing the pin 148 upwardly in position for engagement by the recess 151 of the head 150 when said head has been elevated by the counter-balancing spring 161. This provides an improved means for automatically controlling the actuation of the screws 117 to limit the travel of the core spider 80.

The lower end of each rotary feed tube 36 carries a discharge spout 162 adapted to feed pipe forming material to the mold continuously during the rotation of said feed tube and the reciprocating tampers 63 carried thereby; thus insuring a uniform delivery and tamping of the pipe forming material in the mold throughout the entire formation of a pipe. This provides a highly advantageous construction, by which the entire supply of material is effectively and evenly tamped in the mold, thereby insuring the production of a greatly improved pipe having a uniform density and strength throughout.

The upper ends of the rotary feed tubes 36 carry funnels 163 for receiving the plastic pipe-forming material from feed hoppers 164, which latter comprises casings containing rotary shafts 165 provided with feeding blades 166 and 167; each casing being provided with end and bottom discharge openings 168 and 169 controlled by sliding gates 170 and 171, respectively. The end gate 170 is provided with a yoke 172 pivotally connected to the lever 173, and the bottom gate 171 is connected by a link 174 to a crank 175 on a shaft 176. I have shown a bifurcated rod having a long arm 177 pivotally connected to said lever 173 and a short arm 178 pivotally connected to a crank 179 on the shaft 176; said bifurcated rod being provided with a handle 180 for simultaneously adjusting the two gates 170 and 171. However, the rods 177 and 178 can be dispensed with, if desired, and said gates independently adjusted. The feed shafts 165 are driven by sprocket chains 181 leading from sprocket wheels 167 on the adjacent stub shafts 18 to sprocket wheels 182 loosely mounted on said feed shafts; friction clutches 183 being mounted on the shafts 165 for locking the sprocket wheels 182 to said shafts when it is desired to operate the feed device. This provides efficient and readily controlled means for feeding a constant and uniform supply of plastic material to the feed tubes 36 during the operation of the machine.

A mixer 184 discharges the mixed material into the boot 185 of a bucket elevator 186, which latter is provided with a sprocket wheel 187 driven by a sprocket chain from a sprocket wheel 170 on the main drive shaft 2. The elevator 186 delivers the material on an endless carrier 188 from which it is discharged onto a top platform 189 on the machine frame in convenient position for being shoveled into the feed hoppers 164; said endless carrier being driven by a sprocket chain 190 engaging sprocket wheels on said elevator and conveyer. The mixer is provided with a central shaft 191 carrying series of oppositely inclined mixing blades 192 and 193 at its respective ends for thoroughly mixing the plastic material and feeding it over a central bottom discharge opening 194 controlled by a sliding gate 198; said mixing blades being curved to provide concave front faces for thoroughly mixing the material by forcing the latter inwardly toward the central shaft 191. The mixer shaft 191 is rotated by gearing from a countershaft 195, which latter is provided with a pulley 196 driven by a belt 197 from a pulley 198 on the upper shaft of the elevator 186.

From the above detail description of the construction and operation of the several mechanisms of my improved machine, it will be understood that my invention provides a novel and highly advantageous machine adapted to form plastic pipes having a uniform strength and density throughout.

I have illustrated and described preferred and satisfactory constructions, but changes could be made within the spirit and scope of my invention.

I claim:—

1. In a pipe molding machine, having a mold and a core therefor, the combination of a rotatable feed tube, a delivery pipe on the lower end of the feed tube, means for supplying material to said feed tube, a tubular plunger mounted to reciprocate on said feed tube, tampers carried by said tubular plunger, means for rotating said feed tube and tubular plunger, and means for reciprocating said plunger and tampers.

2. In a pipe molding machine, having a mold and a core therefor, the combination of a centrally located rotatable feed tube, a delivery spout carried thereby, a tubular plunger mounted to reciprocate on said feed tube, tampers carried by said plunger, means for rotating said feed tube, means for reciprocating said plunger and tampers, and automatic means for controlling and making uniform the delivery of the material.

3. In a pipe molding machine, having a mold and a core therefor, the combination of a reciprocating plunger, a spring blade of resilient metal yieldingly clamped on said plunger, and a tamper head on the free end of said spring blade.

4. In a molding machine, the combination of a pipe core, a movable member, a head rotatably mounted on said member and provided with a square bore, means for securing said head to said core, means for shifting said movable member, a square shaft extending slidably through such square bore, and means for rotating said shaft to rotate said core in all shifted positions of said movable member.

5. In a molding machine, the combination of a pipe core, a movable member, a head rotatably mounted on said member and provided with a square bore, means for securing said head to said core, power-actuated means for shifting said movable member, a clutch for controlling said power-actuated means, means for yieldingly maintaining said clutch in disengaged position, manually-operated means for shifting said clutch into engaged position, a square shaft extending slidably through such square bore, and means for rotating said shaft to rotate said core in all shifted positions of said movable member.

6. In a pipe molding machine, the combination of a pipe mold, a central rotating feed tube therefor, a tubular plunger mounted to reciprocate on said feed tube and to turn therewith, spring tamping rods mounted on said head, a hopper above said tube, means for controlling and regulating the feed from the hopper to the tube, and a discharge spout fixed to the lower end of said tube and adapted to discharge in the path of said tampers.

In testimony whereof, I affix my signature, in presence of two witnesses.

ARTHUR C. TUNISON.

Witnesses:
CONSTANCE JOHNSON,
F. W. COPE.

Copies of this patent may be obtained for five cents each, by addressing the "Commissioner of Patents, Washington, D. C."